United States Patent [19]

Kokubo

[11] Patent Number: 5,530,456
[45] Date of Patent: Jun. 25, 1996

[54] POSITION INFORMATION INPUT METHOD AND DEVICE

[75] Inventor: Kenichi Kokubo, Tokyo, Japan

[73] Assignee: NEC Corporation, Tokyo, Japan

[21] Appl. No.: 350,890

[22] Filed: Dec. 7, 1994

[30] Foreign Application Priority Data

Dec. 9, 1993 [JP] Japan .................. 5-308921

[51] Int. Cl.⁶ .................................. G09G 5/08
[52] U.S. Cl. ............................... 345/175; 345/160
[58] Field of Search .................. 345/166, 173, 345/175, 176, 160; 250/221

[56] References Cited

U.S. PATENT DOCUMENTS 4,254,333  3/1981  Bergström .................. 250/221
4,951,034  8/1990  Mazzone et al. ............. 340/710
5,063,289  11/1991  Jasinski et al. .............. 250/221

Primary Examiner—Jeffery Brier
Attorney, Agent, or Firm—Foley & Lardner

[57] ABSTRACT

Light rays emitted from light-emitting units pass through a window of a housing and are reflected by a finger pad of a finger. The reflected light rays again pass through the window and are received by light-receiving elements of each of light-receiving units. These light-receiving elements output reflected light detection signals corresponding to the ridges and recesses of the finger pad. From these reflected light detection signals, a wave-shaping unit outputs rectangular wave signals indicating the moving amount of the finger pad and moving direction signals indicating the moving direction of the finger pad for the individual axes.

5 Claims, 5 Drawing Sheets

POSITION INFORMATION INPUT METHOD AND DEVICE

BACKGROUND OF THE INVENTION

The present invention relates to a position information input method and device and, more particularly, to a position information input method and device for inputting position information which indicates a coordinate position on the display screen of an information processing apparatus such as a computer.

Conventionally, as a position information input device (pointing device) for inputting position information for moving a cursor on the display screen of an information processing apparatus such as a computer, a device such as a trackball has been proposed and used. To make the operation space unnecessary, a trackball is constituted by a spherical body, e.g., a ball which is rotatable and so supported as to expose a part of its outer circumferential portion to the outside, and a circuit for converting the rotation amount of this spherical body into an electrical signal. The amount obtained by rotating the exposed portion of the spherical body when operated with a finger of an operator is converted into an electrical signal. In response to this signal, position information is input to a control unit of an information processing apparatus such as a computer.

A conventional position input device with this arrangement, therefore, has the following problems.

1. When the spherical body is to be rotated with a finger, a finger of an operator becomes fatigued since the spherical body must be rotated with a force larger than its rotational friction.

2. The moving speed of a cursor on a screen is limited by the rotational friction of the spherical body even if the cursor is to be moved on the screen at high speed.

3. The spherical body requires cleaning because it is in direct contact with a finger in operation.

4. When the operability of the device is taken into consideration, the size of the spherical body is limited; i.e., the miniaturization of the spherical body has its limit.

SUMMARY OF THE INVENTION

It is therefore a principal object of the present invention to provide a position information input method and device which can reduce the load on a finger during operation to allow a comfortable operation, and can be miniaturized.

To achieve the above object, in a position information input method according to the present invention, two beam-like light rays are emitted toward a finger pad of a finger in different directions, the light rays reflected by the finger pad are received to generate reflected light detection signals corresponding to ridges and recesses of the finger pad, and position information which changes in accordance with movement of the finger pad is generated on the basis of the reflected light detection signals.

In addition, a position information input device according to the present invention comprises a housing having a window for detecting movement of a finger pad of a finger placed on top of the window, first; and second light-emitting units arranged inside the housing to emit beam-like light rays toward the window in different directions, first and second light-receiving units arranged inside the housing to receive light rays emitted from the first and second light-emitting units and reflected by the finger pad present near the window and output reflected light detection signals corresponding to ridges and recesses of the finger pad, and a wave-shaping unit for generating rectangular wave signals corresponding to a moving amount of the finger pad and moving direction signals corresponding to a moving direction of the finger pad on the basis of the reflected light detection signals from the first and second light-receiving units.

The light rays emitted from the first and second light-emitting units pass through the window of the housing and are reflected by the finger pad of a finger. The reflected light rays again pass through the window and are received by the first and second light-receiving units. Consequently, the reflected light detection signals corresponding to the ridges and recesses of the finger pad are applied to the wave-shaping unit and converted into the rectangular wave signals indicative of the moving amount of the finger pad and the moving direction signals indicative of the moving direction of the finger pad. These signals are then output to a host apparatus.

DETAILED DESCRIPTION OF THE PREFERRED EMBODIMENT

The present invention will be described below with reference to the accompanying drawings.

Figure 1:
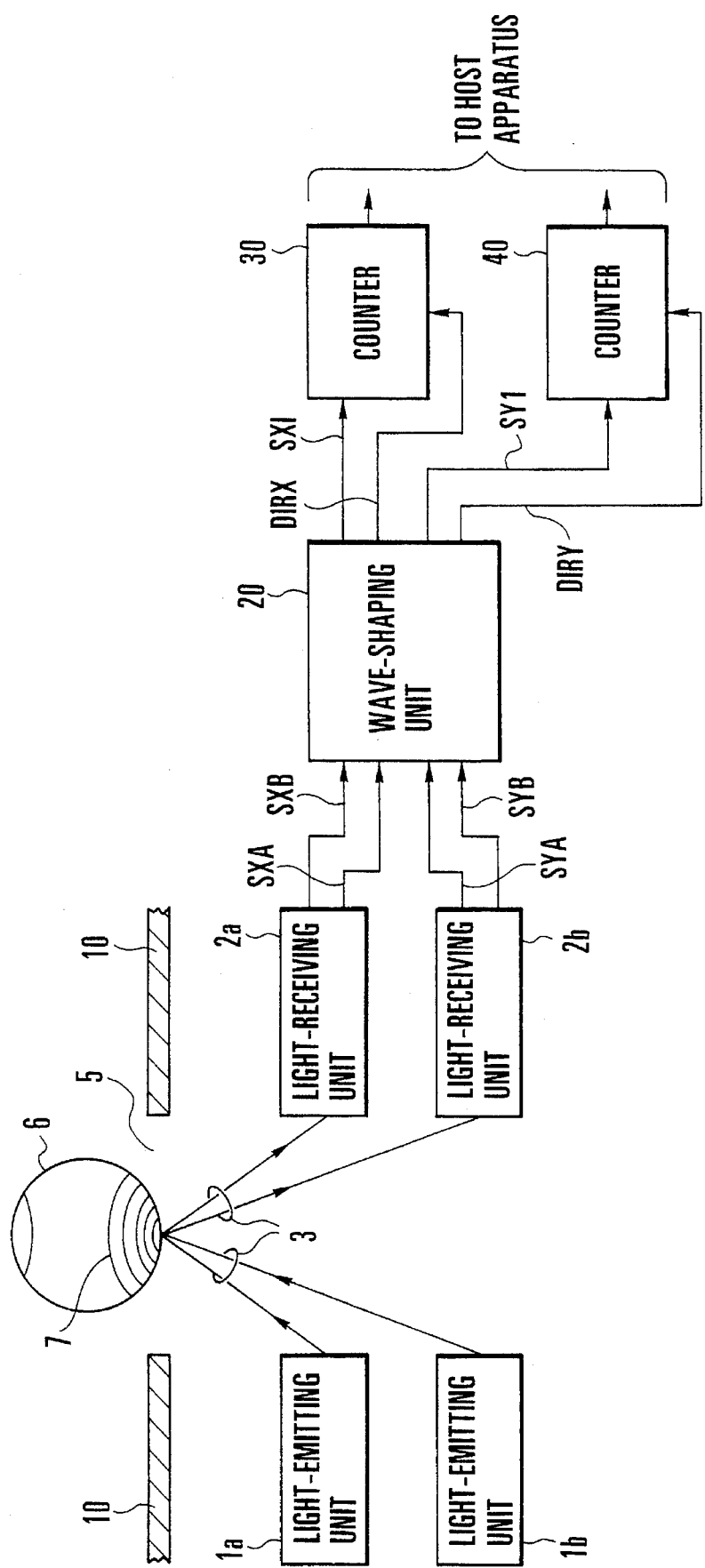
FIG. 1 is a block diagram showing a position information input device according to an embodiment of the present invention.

FIG. 1 shows a position information input device as an embodiment of the present invention. In FIG. 1, reference numerals 1a and 1b denote light-emitting units each for emitting a beam-like light ray with a small diameter (e.g., a laser beam about 50 μm in diameter); 6, a finger of an operator; 7, a finger pad of the finger 6; 10, a housing which is made of a resin such as plastics and used to shield disturbing light to light-receiving units 2a and 2b; and 5, a circular window (hole) formed in the top wall of the housing 10 to project the light rays 3 onto the finger 6. The light-receiving units 2a and 2b receive the light rays 3 emitted from the light-emitting units 1a and 1b and reflected by the finger pad 7 of the finger 6, and output reflected light detection signals SXA and SXB, and SYA and SYB, respectively.

Reference numeral 20 denotes a wave-shaping unit which converts the reflected light detection signals SXA and SXB, and SYA and SYB into pulse-like rectangular wave signals SX1 and SY1, respectively, which indicate the moving amount of the finger pad 7, and into moving direction signals DIRX and DIRY, respectively, which indicate the moving direction of the finger pad 7. Reference numerals 30 and 40 denote counters for independently performing subtraction or addition for the rectangular wave signals SX1 and SY1 on the basis of the moving direction signals DIRX and DIRY, respectively, and outputting the count results to a host apparatus (not shown).

Figure 2A:
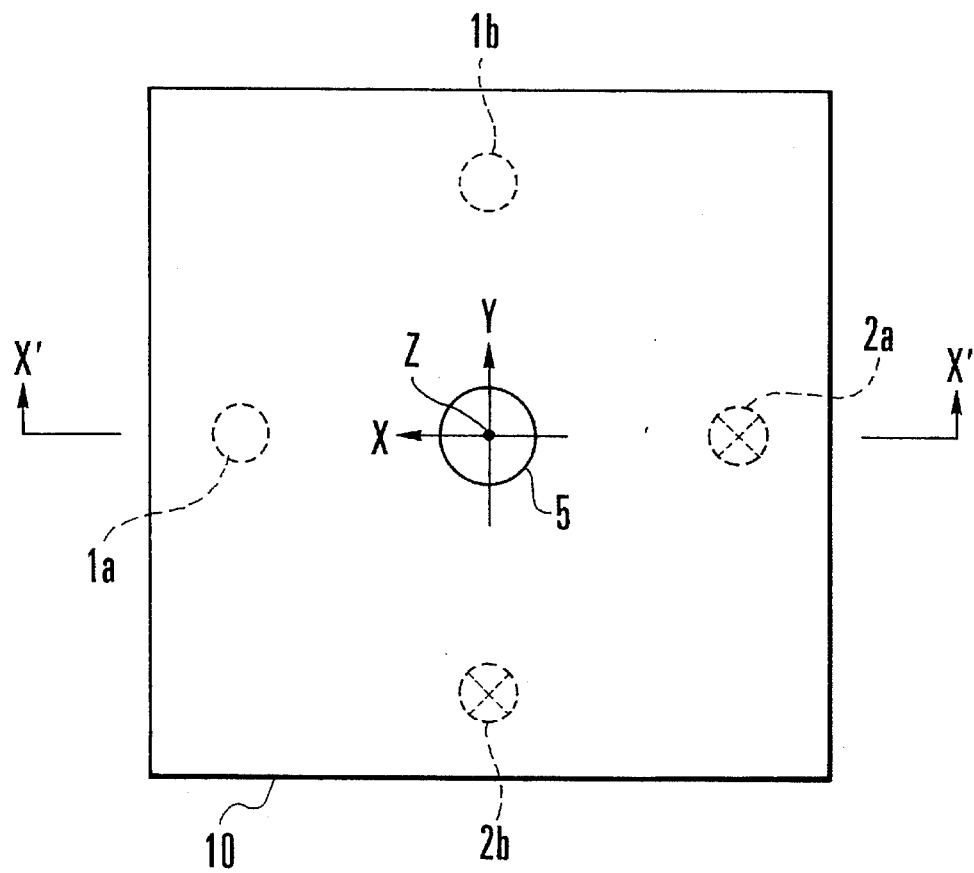
FIGS. 2A and 2B are plan and sectional views, respectively, showing the position information input device.
Figure 2B:
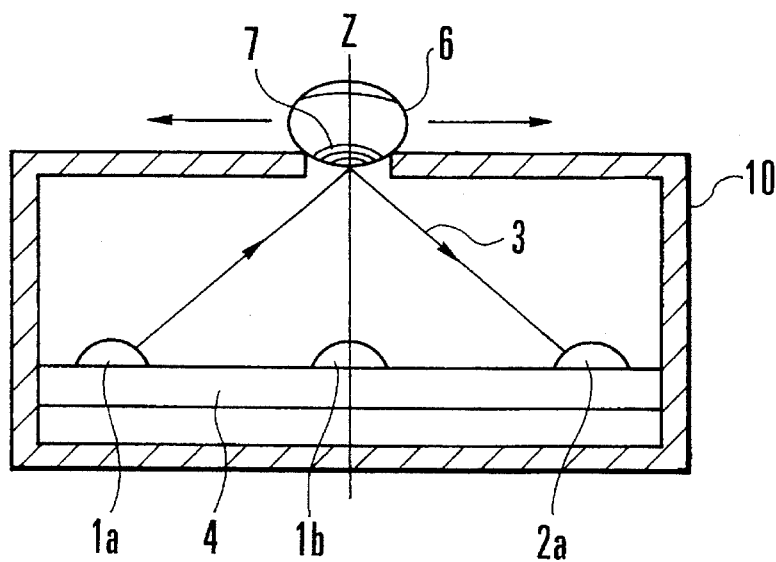

FIG. 2A shows the arrangement of the position information input device, and FIG. 2B shows a section taken along the line X'—X' in FIG. 2A.

Reference numeral 4 denotes a printed wiring board arranged to oppose the top wall of the housing 10 in which the window 5 is formed. The light-emitting unit 1a and the light-receiving unit 2a are arranged to oppose each other on the X-axis, and the light-emitting unit 1b and the light-receiving unit 2b are arranged to oppose each other on the Y-axis, on the printed wiring board. 4. The X- and Y-axes perpendicularly cross each other at a central axis Z of the window 5.

When an operator moves the finger 6 near the upper side of the window 5, the light rays 3 emitted from the light-emitting units 1a and 1b pass through the window 5 and are reflected by the finger pad 7 of the finger 6. The light rays 3 again passing through the window 5 are received by the light-receiving units 2a and 2b.

Upon receiving the rays, the light-receiving units 2a and 2b output the reflected light detection signals SXA and SXB, and SYA and SYB, respectively. The wave-shaping unit 20 shapes these signals into the pulse-like rectangular wave signals SX1 and SY1 and also outputs the moving direction signals DIRX and DIRY by detecting the moving direction of the finger 6. Upon receiving the moving direction signals DIRX and DIRY, the counters 30 and 40 perform addition or subtraction for the numbers of pulses of the rectangular wave signals SX1 and SY1, respectively. On the basis of the counting results, a host apparatus such as an information processing apparatus calculates position information and controls the position of a cursor on the screen.

The light-receiving operation of the light-receiving units 2a and 2b will be described below.

Figure 3:
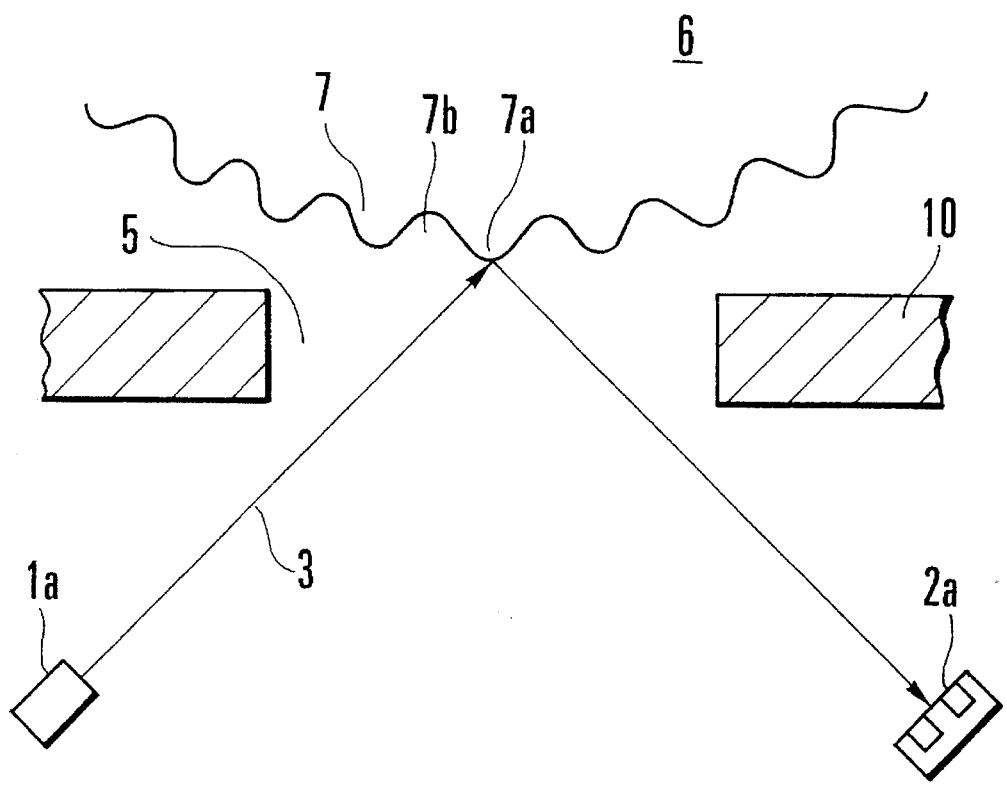
FIG. 3 is a view for explaining the propagation of a light ray on the X axis.

FIG. 3 explains the propagation of the light ray 3 on the X-axis. In FIG. 3, reference numeral 6 denotes a finger; 7, a finger pad; 7a, a ridge portion of the finger pad 7; and 7b, a recessed portion of the finger pad 7.

The light ray 3 emitted from the light-emitting unit 1a passes through the window 5 formed in the housing 10 and is reflected by the ridge portion 7a of the finger pad 7. The reflected light ray 3 again passes through the window 5 and is detected by the light-receiving unit 2a.

Figure 4:
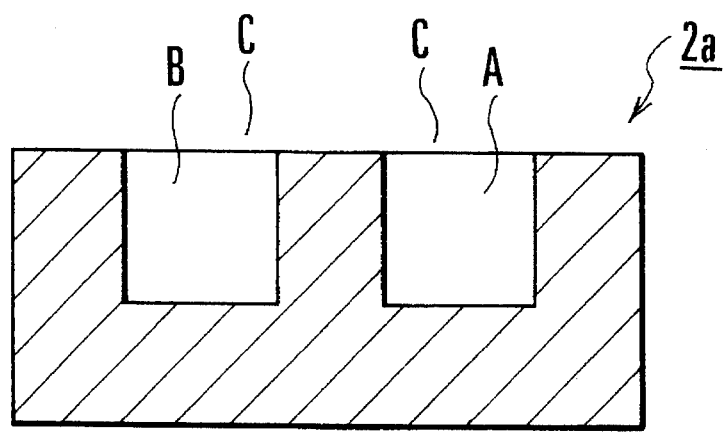
FIG. 4 is a sectional view showing the arrangement of a light-receiving unit.

FIG. 4 shows the arrangement of the light-receiving units 2a and 2b. Reference symbols A and B denote light-receiving elements for independently detecting the light ray 3; and C, light-receiving surfaces. The light-receiving surfaces C are arranged in series on the X-axis with a spacing at which they can simultaneously detect the beam-like light ray 3 reflected by the ridge portion 7a.

Generally, the spacings between the ridges of the finger pad 7 are around 500 μm. Therefore, when the finger 6 moves to allow the beam-like light ray 3 (about 50 μm in diameter) to be incident on the recessed portion 7b of the finger pad 7, the light ray 3 is reflected in a direction different from the direction to the light-receiving unit 2a. Consequently, the light-receiving unit 2a does not detect this reflected light.

Therefore, the ridge portion 7a and the recessed portion 7b as the locations to be illuminated with the light ray 3 are alternately switched as the finger 6 moves. As a consequence, the light ray 3 reflected by the ridge portion 7a moves on the light-receiving surfaces C of the light-receiving unit 2a from the light-receiving element A to B, or B to A. This movement is intermittently detected by the light-receiving elements A and B.

Figure 5:
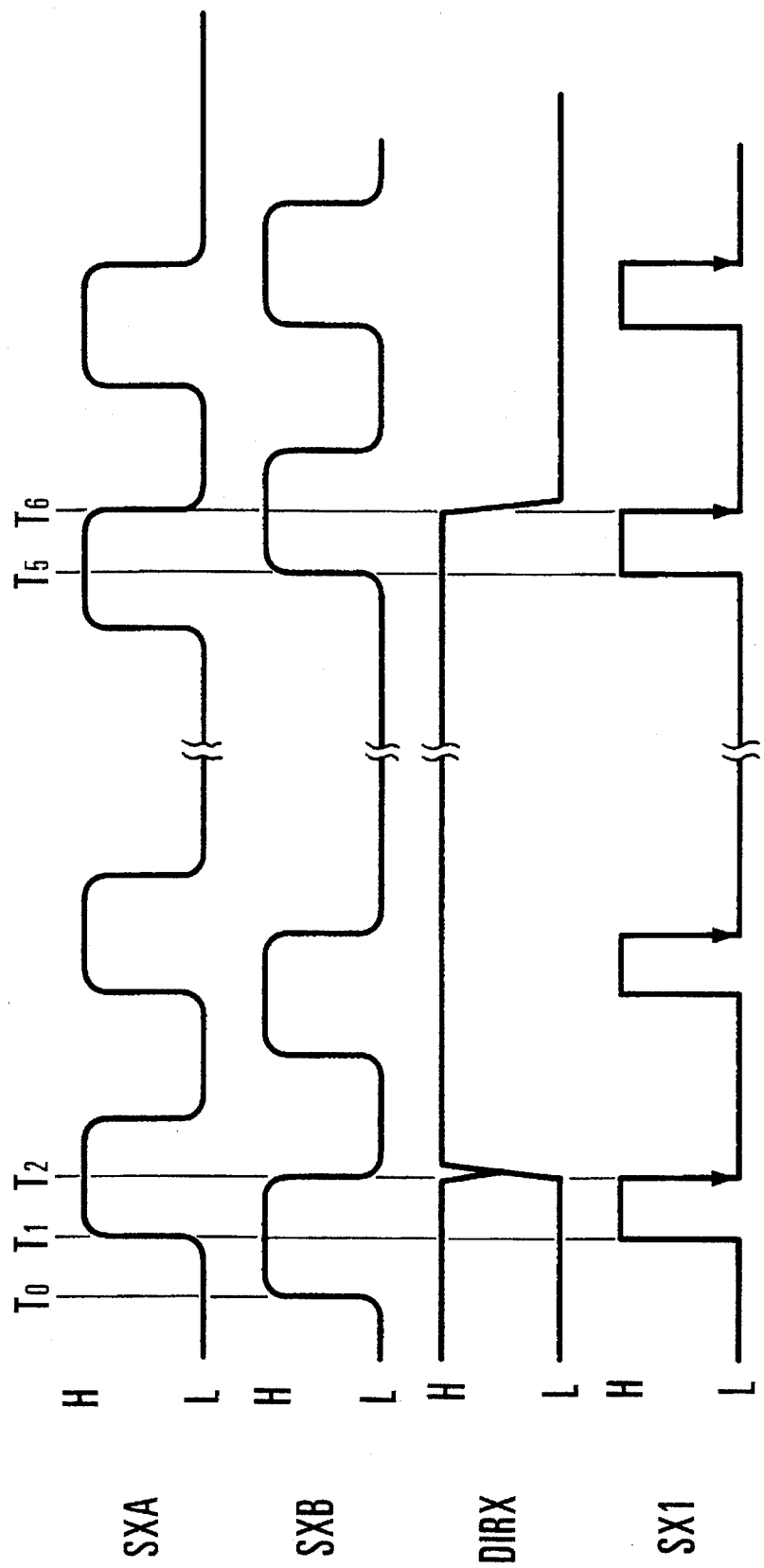
FIGS. 5A to 5C are views for explaining the detection operation of the light-receiving unit.

FIGS. 5A to 5C explain the detection operation of the light-receiving units 2a and 2b. The ridge portion 7a of the finger pad 7 moves to the left in an order of FIGS. 5A, 5B, and 5C.

Figure 6A:
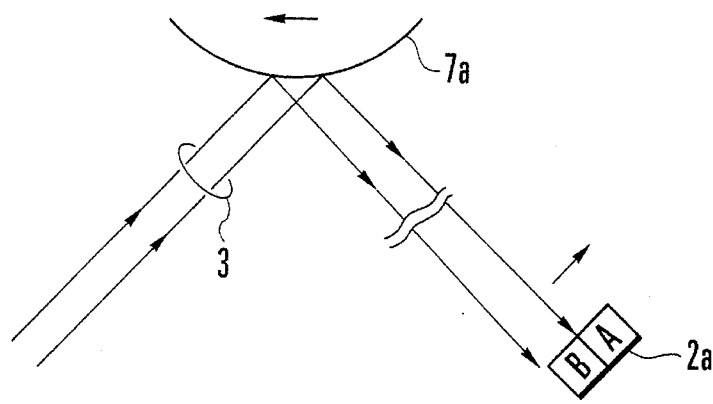
FIG. 6 is a timing chart showing signals of the individual parts in FIG. 1.
Figure 6B:
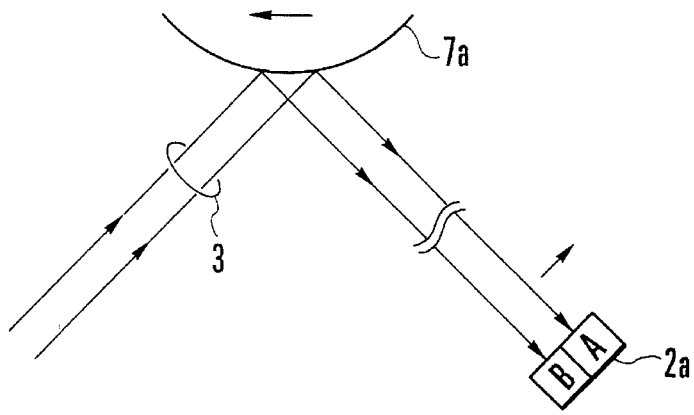
Figure 6C:
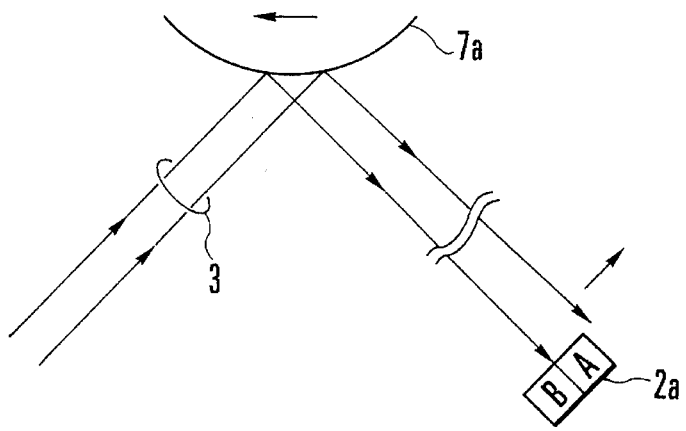

FIG. 6 is a timing chart showing signals of the individual parts in FIG. 1.

At time T0 in FIG. 6, the ridge portion 7a of the finger pad 7 is slightly shifted to the right as illustrated in FIG. 5A. Therefore, the light ray 3 emitted from the light-emitting unit 1a is reflected by the ridge portion 7a of the finger pad 7 and detected only by the receiving element B of the light-receiving unit 2a.

Consequently, in FIG. 6, the reflected light detection signal SXB from the light-receiving element B goes to level H which indicates "reflected light is present," and the reflected light detection signal SXA from the light-receiving element A remains at level L.

At time T1, the ridge portion 7a of the finger pad 7 moves to the middle position as in FIG. 5B. Consequently, the light ray 3 emitted from the light-emitting unit 1a is reflected by the ridge portion 7a of the finger pad 7 and detected by both the light-receiving elements A and B of the light-receiving unit 2a. In FIG. 6, therefore, both the reflected light detection signals SXA and SXB go to level H indicating "reflected light is present."

At time T2, the ridge portion 7a of the finger pad 7 is slightly shifted to the left as in FIG. 5C. Therefore, the light ray 3 emitted from the light-emitting unit 1a is reflected by the ridge portion 7a of the finger pad 7 and detected only by the light-receiving element A of the light-receiving unit 2a. Consequently, in FIG. 6, the reflected light detection signal SXB goes to level L which indicates "no reflected light," and the reflected light detection signal SXA from the light-receiving element A remains at level H.

That is, as the ridge portion 7a of the finger pad 7 moves from the right to the left, the light ray 3 reflected by the ridge portion 7a moves on the light-receiving surfaces of the light-receiving unit 2a in the direction from B to A. At time T2, the state transits from the one (FIG. 5B) in which the light ray 3 is detected by the two light-receiving elements A and B simultaneously to the one (FIG. 5C) in which the light ray 3 is detected only by the light-receiving element A. It is therefore determined that the light ray 3 has moved on the light-receiving surfaces from B to A, i.e., that the finger 6 has moved from the right to the left. As a result, the moving direction signal DIRX goes to level H which indicates "movement to the left."

This moving direction signal DIRX is held at that level until the moving direction changes. When the reverse transition of the above transition takes place, i.e., when the state transits from the one (FIG. 5B) at time T5 to the one (FIG. 5A) at time T6 in which the light ray 3 is detected only by the light-receiving element B, it is determined that the light ray 3 has moved on the light-receiving surfaces C from A to B, i.e., that the finger 6 has moved from the left to the right. Consequently, the moving direction signal DIRX goes to level L indicating "movement to the right."

In this manner, the moving direction of the finger 6 is detected in accordance with which of the two light-receiving elements A and B first becomes unable to detect the light ray 3 from the state (FIG. 5B) in which the light-receiving elements A and B simultaneously detect the light ray 3.

The rectangular wave signal SX1 indicating the moving amount is at level H in a period during which both the light-receiving elements A and B detect the reflected light, i.e., in the period from time T1 to T2 during which both the reflected light detection signals SXA and SXB are at level H.

Note that the rectangular wave signal SX1 is indicative of the moving amount of the ridge portion 7a of the finger pad 7 and need only be output each time the reflected light traverses the light-receiving surface C of the light-receiving unit 2a. As an example, it is possible to shape one of the output reflected light detection signals SXA and SXB from the light-receiving elements A and B and output this shaped signal as the rectangular wave signal SX1.

The movement detection as discussed above is carried out in exactly the same fashion in the X- and Y-axis directions. The wave-shaping unit 20 generates the rectangular wave signals SX1 and SY1 and the moving direction signals DIRX and DIRY that are indicative of the moving amounts and the moving directions, respectively, in these two axial directions.

These signals are input to the counters 30 and 40 provided for the two axes. The counters 30 and 40 perform addition or subtraction for the numbers of pulses of the rectangular wave signals SX1 and SY1 on the basis of the moving direction signals DIRX and DIRY. For example, the counters 30 and 40 add the numbers of pulses when the signals DIRX and DIRY are at level H, and subtract the numbers of pulses when the signals are at level L. The counters 30 and 40 output the counting results to the host apparatus.

In the above embodiment, the counters 30 and 40 are provided to count the output rectangular wave signals SX1 and SY1 from the wave-shaping unit 20, and the counting results are output to the host apparatus. However, these counters 30 and 40 can also be provided in the host apparatus. In this case, addition or subtraction is performed for the output rectangular wave signals SX1 and SY1 from the position information input device on the basis of the moving direction signals DIRX and DIRY, thereby calculating information indicating the position on the display screen. This arrangement can also achieve the same effect as in the above embodiment.

It is also possible to set a predetermined threshold value for the light reception level detected by the light-receiving elements A and B of each of the light-receiving units 2a and 2b. In this case, it is determined that "reflected light is present" if a light reception level higher than the threshold value is detected. Consequently, erroneous detection caused by light rays randomly reflected by the finger pad 7 can be prevented, making it possible to output accurate reflected light detection signals SYA and SYB corresponding to the ridges and recesses of the finger pad 7.

Note that a comparing and determining means for performing comparison with this threshold value can be provided in each of the light-receiving units 2a and 2b or in the input stage of the wave-shaping unit 20.

As has been discussed above, in the position information input method according to the present invention, two beam-like light rays are emitted to the finger pad of a finger in different directions, and reflected light detection signals corresponding to the ridges and recesses of the finger pad are generated by receiving the light rays reflected by the finger pad. On the basis of these reflected light detection signals, position information which changes in accordance with the movement of the finger pad is generated. Therefore, in comparison to conventional position information input devices, the load on a finger during operation can be reduced, and this realizes a comfortable operation.

In addition, in the position information input device according to the present invention, the first and second light-emitting units emit beam-like light rays toward the window in different directions. The first and second light-receiving units receive the light rays emitted from the respective corresponding light-emitting units and reflected by the finger pad of a finger present near the window, and output reflected light detection signals corresponding to the ridges and recesses of the finger pad. On the basis of these reflected light detection signals, the wave-shaping unit generates rectangular wave signals corresponding to the moving amount of the finger pad and moving direction signals corresponding to the moving direction of the finger pad. Therefore, in comparison to conventional position information input devices, the load on a finger during operation can be reduced to allow a comfortable operation, and the device itself can be miniaturized.

In the present invention, the counter for adding or subtracting the rectangular wave signal on the basis of the moving direction signal is provided for each light-receiving unit, and the position information is calculated from signals from these counters and output to a host apparatus. Therefore, an arrangement for calculating the position information from these signals need not be provided in the host apparatus, resulting in a simple configuration.

Also, two light-receiving elements arranged adjacent to each other are provided in each light-receiving unit so that the two light-receiving elements can simultaneously receive a light ray. The wave-shaping unit determines a light reception order by these light-receiving elements of each light-receiving unit on the basis of the output reflected light detection signals from the light-receiving elements, and outputs the moving direction signal for each axis in accordance with the determination result. This makes it possible to generate accurate moving direction signals without using any complicated arrangement.

Furthermore, on the basis of the output reflected light detection signals from the individual light-receiving elements, the wave-shaping unit detects which of the light-receiving elements becomes unable to detect light after they have simultaneously received light, and in this manner determines a light reception order by these light-receiving elements. Consequently, the light reception order can be determined with a simple circuit configuration, and this permits miniaturization of the device.

What is claimed is:

1. A method of inputting information to affect a coordinate position of a cursor on a display screen of an information processing apparatus, comprising the steps of:

emitting two beam-like light rays toward a finger pad of a finger in different directions, receiving reflected light rays reflected by the finger pad, the reflected light rays corresponding to ridges and recesses of the finger pad;

generating reflected light detection signals corresponding to the reflected light rays; and generating signals to affect the coordinate position of the cursor in accordance with the reflected light detection signals.

2. A device for inputting information to affect a coordinate position of a cursor on a display screen of an information processing apparatus, comprising:

a housing having a window for detecting movement of a finger pad of a finger placed on top of said window;

first and second light-emitting units arranged inside said housing to emit beam-like light rays toward said window in different directions;

first and second light-receiving units arranged inside said housing to receive light rays emitted from said first and second light-emitting units and reflected by the finger pad present near said window and output reflected light detection signals corresponding to ridges and recesses of the finger pad; and a wave-shaping unit for generating rectangular wave signals corresponding to a moving amount of the finger pad and moving direction signals corresponding to a moving direction of the finger pad on the basis of the reflected light detection signals from said first and second light-receiving units.

3. A device according to claim 2, wherein each of said light-receiving units includes a counter for adding or subtracting the rectangular wave signal on the basis of the moving direction signal.

4. A device according to claim 2, wherein each of said light-receiving units includes two light-receiving elements arranged adjacent to each other so as to be able to simultaneously receive the light ray, and output means for outputting a reflected light detection signal, for each of said light-receiving elements, which corresponds to the presence or absence of light reception by each light-receiving element, and said wave-shaping unit includes determining means for determining a light reception order by said light-receiving elements of each light-receiving unit on the basis of the output reflected light detection signals from each light-receiving unit, and output means for outputting the moving direction signal for each light-receiving unit in accordance with the determination result.

5. A device according to claim 4, wherein said wave-shaping unit includes determining means for determining the light reception order by said light-receiving elements of each light-receiving unit by detecting, on the basis of the reflected light detection signals output from said light-receiving elements, which element of said light-receiving elements becomes unable to receive light after said light-receiving elements have simultaneously received light.

* * * * *